United States Patent
Paczkowski et al.

(10) Patent No.: US 9,613,208 B1
(45) Date of Patent: Apr. 4, 2017

(54) TRUSTED SECURITY ZONE ENHANCED WITH TRUSTED HARDWARE DRIVERS

(71) Applicant: Sprint Communications Company L.P., Overland Park, KS (US)

(72) Inventors: Lyle W. Paczkowski, Mission Hills, KS (US); William M. Parsel, Overland Park, KS (US); Carl J. Persson, Olathe, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 62 days.

(21) Appl. No.: 13/802,404

(22) Filed: Mar. 13, 2013

(51) Int. Cl.
*G06F 21/00* (2013.01)
*G06F 21/53* (2013.01)
*G06F 21/57* (2013.01)
*G06F 21/64* (2013.01)
*G06F 21/56* (2013.01)

(52) U.S. Cl.
CPC ............. *G06F 21/53* (2013.01); *G06F 21/57* (2013.01); *G06F 21/64* (2013.01); *G06F 21/00* (2013.01); *G06F 21/56* (2013.01)

(58) Field of Classification Search
CPC .......... G06F 21/53; G06F 21/57; G06F 21/56; G06F 21/00; G06F 21/64
See application file for complete search history.

(56) References Cited

U.S. PATENT DOCUMENTS

| | | | |
|---|---|---|---|
| 5,303,378 | A | 4/1994 | Cohen |
| 5,321,735 | A | 6/1994 | Breeden et al. |
| 5,764,889 | A | 6/1998 | Ault et al. |
| 5,796,952 | A | 8/1998 | Davis et al. |
| 6,131,024 | A | 10/2000 | Boltz |

(Continued)

FOREIGN PATENT DOCUMENTS

| | | |
|---|---|---|
| EP | 1933252 A1 | 6/2008 |
| WO | WO2011025433 A1 | 3/2011 |

(Continued)

OTHER PUBLICATIONS

Notice of Allowance dated Dec. 22, 2014, U.S. Appl. No. 13/470,203, filed May 11, 2012.

(Continued)

*Primary Examiner* — Farid Homayounmehr
*Assistant Examiner* — Christopher C Harris

(57) ABSTRACT

An electronic device comprises a processor, a permissive sector, a trusted security zone that is separate from the permissive sector, a hardware driver, a first trusted application, stored in the trusted security zone, that is configured to invoke the hardware driver in response to activation instructions, and a second trusted application, stored in the trusted security zone, that when executed on the processor, configures the processor to: amass information about an uncompromised state of the hardware driver, store the information about the uncompromised state of the hardware driver in the trusted security zone, and compare, in response to receipt of activation instructions by the first trusted application, the information about the uncompromised state of the hardware driver with a current state of the hardware driver, and perform an action in response to a result of the comparison.

17 Claims, 7 Drawing Sheets

(56) References Cited

U.S. PATENT DOCUMENTS

| | | |
|---|---|---|
| 6,177,860 B1 | 1/2001 | Cromer et al. |
| 6,219,712 B1 | 4/2001 | Mann et al. |
| 6,363,150 B1 | 3/2002 | Bhagavath et al. |
| 6,389,403 B1 | 5/2002 | Dorak, Jr. |
| 6,477,180 B1 | 11/2002 | Aggarwal et al. |
| 6,507,869 B1 | 1/2003 | Franke et al. |
| 6,507,904 B1 | 1/2003 | Ellison et al. |
| 6,614,893 B1 | 9/2003 | Paiz |
| 6,651,171 B1 | 11/2003 | England et al. |
| 6,668,322 B1 | 12/2003 | Wood et al. |
| 6,691,230 B1 | 2/2004 | Bardon |
| 6,754,784 B1 | 6/2004 | North et al. |
| 6,823,454 B1 | 11/2004 | Hind et al. |
| 6,824,064 B2 | 11/2004 | Guthery et al. |
| 6,895,234 B1 | 5/2005 | Laursen et al. |
| 7,043,241 B1 | 5/2006 | Sladek et al. |
| 7,069,234 B1 | 6/2006 | Cornelius et al. |
| 7,366,806 B2 | 4/2008 | Milenkovic et al. |
| 7,387,240 B2 | 6/2008 | Ziegler |
| 7,519,824 B1 | 4/2009 | Peyravian et al. |
| 7,552,467 B2 | 6/2009 | Lindsay |
| 7,571,364 B2 | 8/2009 | Whetsel |
| 7,574,382 B1 | 8/2009 | Hubert |
| 7,650,645 B1 | 1/2010 | Langendorf et al. |
| 7,716,720 B1* | 5/2010 | Marek et al. .................. 726/2 |
| 7,761,558 B1 | 7/2010 | Jindal et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,073,428 B2 | 12/2011 | Khetawat et al. |
| 8,086,238 B1 | 12/2011 | Kosar |
| 8,112,794 B2 | 2/2012 | Little et al. |
| 8,190,919 B2 | 5/2012 | Natarajan et al. |
| 8,204,480 B1* | 6/2012 | Lindteigen et al. .......... 455/411 |
| 8,238,823 B2 | 8/2012 | Maugars et al. |
| 8,271,336 B2 | 9/2012 | Mikurak |
| 8,316,237 B1 | 11/2012 | Felsher et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,588,749 B1 | 11/2013 | Sadhvani et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,650,492 B2 | 2/2014 | Mui et al. |
| 8,661,119 B1 | 2/2014 | Jindal et al. |
| 8,667,607 B2 | 3/2014 | Paczkowski et al. |
| 8,681,969 B1 | 3/2014 | Rodde et al. |
| 8,707,056 B2 | 4/2014 | Felton |
| 8,712,407 B1 | 4/2014 | Cope et al. |
| 8,718,554 B2 | 5/2014 | Abel |
| 8,719,586 B1 | 5/2014 | Paleja et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,797,875 B2 | 8/2014 | Garcia et al. |
| 8,811,971 B2 | 8/2014 | Corda et al. |
| 8,831,998 B1 | 9/2014 | Cramer et al. |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,886,925 B2 | 11/2014 | Qureshi et al. |
| 8,954,588 B1 | 2/2015 | Bertz et al. |
| 8,984,592 B1 | 3/2015 | Paczkowski et al. |
| 8,989,705 B1 | 3/2015 | Katzer et al. |
| 9,015,068 B1 | 4/2015 | Bertz et al. |
| 9,021,585 B1 | 4/2015 | Paczkowski et al. |
| 9,027,102 B2 | 5/2015 | Katzer et al. |
| 9,049,013 B2 | 6/2015 | Paczkowski et al. |
| 9,049,186 B1 | 6/2015 | Paczkowski et al. |
| 9,066,230 B1 | 6/2015 | Paczkowski et al. |
| 9,069,952 B1 | 6/2015 | Paczkowski et al. |
| 9,104,840 B1 | 8/2015 | Paczkowski et al. |
| 9,118,655 B1 | 8/2015 | Paczkowski et al. |
| 9,161,227 B1 | 10/2015 | Bye et al. |
| 9,161,325 B1 | 10/2015 | Urbanek |
| 9,171,243 B1 | 10/2015 | Cordes et al. |
| 9,183,412 B2 | 11/2015 | Bye et al. |
| 9,183,606 B1 | 11/2015 | Paczkowski et al. |
| 9,185,626 B1 | 11/2015 | Kunkel et al. |
| 9,191,388 B1 | 11/2015 | Paczkowski et al. |
| 9,191,522 B1 | 11/2015 | Krieger et al. |
| 9,208,339 B1 | 12/2015 | Paczkowski et al. |
| 9,210,576 B1 | 12/2015 | Cope et al. |
| 9,215,180 B1 | 12/2015 | Bertz et al. |
| 9,226,145 B1 | 12/2015 | Loman et al. |
| 9,230,085 B1 | 1/2016 | Paczkowski et al. |
| 9,253,589 B2 | 2/2016 | McCann et al. |
| 9,268,959 B2 | 2/2016 | Paczkowski et al. |
| 9,282,898 B2 | 3/2016 | McRoberts et al. |
| 9,324,016 B1 | 4/2016 | Cordes et al. |
| 9,374,363 B1 | 6/2016 | Paczkowski et al. |
| 9,384,498 B1 | 7/2016 | Bertz et al. |
| 9,443,088 B1 | 9/2016 | Bye et al. |
| 9,454,723 B1 | 9/2016 | Cordes et al. |
| 9,473,945 B1 | 10/2016 | Marquardt et al. |
| 2001/0041591 A1 | 11/2001 | Carroll |
| 2002/0002468 A1 | 1/2002 | Spagna et al. |
| 2002/0007456 A1 | 1/2002 | Peinado et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0166070 A1* | 11/2002 | Mualem et al. .............. 713/201 |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0045273 A1 | 3/2003 | Pyhalammi et al. |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0216143 A1 | 11/2003 | Roese et al. |
| 2003/0229514 A2 | 12/2003 | Brown |
| 2003/0237002 A1 | 12/2003 | Oishi et al. |
| 2004/0064351 A1 | 4/2004 | Mikurak |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Rindborg et al. |
| 2004/0264372 A1 | 12/2004 | Huang |
| 2005/0015601 A1 | 1/2005 | Tabi |
| 2005/0045719 A1 | 3/2005 | Yang |
| 2005/0052994 A1 | 3/2005 | Lee |
| 2005/0091505 A1 | 4/2005 | Riley et al. |
| 2005/0123596 A1 | 6/2005 | Kohane et al. |
| 2005/0125396 A1 | 6/2005 | Liu |
| 2005/0138433 A1 | 6/2005 | Linetsky |
| 2005/0181796 A1 | 8/2005 | Kumar et al. |
| 2005/0228892 A1 | 10/2005 | Riley et al. |
| 2005/0235166 A1 | 10/2005 | England et al. |
| 2005/0239481 A1 | 10/2005 | Seligmann |
| 2005/0272445 A1 | 12/2005 | Zellner |
| 2005/0283660 A1 | 12/2005 | McKeen et al. |
| 2005/0289355 A1 | 12/2005 | Kitariev et al. |
| 2006/0008256 A1 | 1/2006 | Khedouri et al. |
| 2006/0030291 A1 | 2/2006 | Dawson et al. |
| 2006/0036851 A1 | 2/2006 | DeTreville |
| 2006/0040641 A1 | 2/2006 | Dawson et al. |

(56) References Cited

U.S. PATENT DOCUMENTS

| | | |
|---|---|---|
| 2006/0053283 A1* | 3/2006 | Feinleib .............. G06F 21/121 713/165 |
| 2006/0074544 A1 | 4/2006 | Morariu et al. |
| 2006/0129488 A1 | 6/2006 | Vincent |
| 2006/0156026 A1 | 7/2006 | Utin |
| 2006/0164978 A1 | 7/2006 | Werner et al. |
| 2006/0168637 A1 | 7/2006 | Vysotsky et al. |
| 2006/0171537 A1 | 8/2006 | Enright |
| 2006/0190605 A1 | 8/2006 | Franz et al. |
| 2006/0212853 A1 | 9/2006 | Sutardja |
| 2006/0218320 A1 | 9/2006 | Avraham et al. |
| 2006/0224901 A1 | 10/2006 | Lowe |
| 2006/0245438 A1 | 11/2006 | Sajassi et al. |
| 2006/0258289 A1 | 11/2006 | Dua |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0006175 A1* | 1/2007 | Durham .............. G06F 21/54 717/131 |
| 2007/0011061 A1 | 1/2007 | East |
| 2007/0038648 A1 | 2/2007 | Chetwood et al. |
| 2007/0061535 A1 | 3/2007 | Xu et al. |
| 2007/0061570 A1* | 3/2007 | Holtzman .......... G06F 21/575 713/168 |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdznski |
| 2007/0104215 A1 | 5/2007 | Wang et al. |
| 2007/0118880 A1* | 5/2007 | Mauro, II ........................ 726/4 |
| 2007/0143210 A1 | 6/2007 | Yeung et al. |
| 2007/0150730 A1 | 6/2007 | Conti |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2007/0280245 A1 | 12/2007 | Rosberg |
| 2007/0283449 A1 | 12/2007 | Blum et al. |
| 2008/0005794 A1* | 1/2008 | Inoue et al. .................. 726/22 |
| 2008/0014867 A1 | 1/2008 | Finn |
| 2008/0020745 A1 | 1/2008 | Bae et al. |
| 2008/0022374 A1 | 1/2008 | Brown et al. |
| 2008/0022389 A1 | 1/2008 | Calcev et al. |
| 2008/0034231 A1 | 2/2008 | Ginter et al. |
| 2008/0051142 A1 | 2/2008 | Calvet et al. |
| 2008/0092213 A1 | 4/2008 | Wei et al. |
| 2008/0097793 A1 | 4/2008 | Dicks et al. |
| 2008/0108321 A1 | 5/2008 | Taaghol et al. |
| 2008/0109662 A1 | 5/2008 | Natarajan et al. |
| 2008/0121687 A1 | 5/2008 | Buhot |
| 2008/0146280 A1 | 6/2008 | Sasse et al. |
| 2008/0155271 A1 | 6/2008 | Barck et al. |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0168515 A1 | 7/2008 | Benson et al. |
| 2008/0176538 A1 | 7/2008 | Terrill et al. |
| 2008/0188178 A1 | 8/2008 | Maugars et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0232259 A1 | 9/2008 | Thomson |
| 2008/0244758 A1* | 10/2008 | Sahita et al. ................. 726/34 |
| 2008/0271163 A1* | 10/2008 | Stillerman .......... G06F 21/572 726/30 |
| 2009/0047923 A1 | 2/2009 | Jain et al. |
| 2009/0049220 A1 | 2/2009 | Conti et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0118839 A1 | 5/2009 | Accapadi et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0164800 A1 | 6/2009 | Johansson et al. |
| 2009/0182605 A1 | 7/2009 | Lappas et al. |
| 2009/0182634 A1 | 7/2009 | Park et al. |
| 2009/0192915 A1 | 7/2009 | Fernandez |
| 2009/0193491 A1 | 7/2009 | Rao |
| 2009/0204959 A1 | 8/2009 | Anand et al. |
| 2009/0227290 A1 | 9/2009 | Chien |
| 2009/0248445 A1 | 10/2009 | Harnick |
| 2009/0271321 A1 | 10/2009 | Stafford |
| 2009/0281947 A1 | 11/2009 | Erel |
| 2009/0300599 A1 | 12/2009 | Piotrowski |
| 2009/0312011 A1 | 12/2009 | Huomo et al. |
| 2009/0320028 A1 | 12/2009 | Gellerich et al. |
| 2009/0320048 A1* | 12/2009 | Watt .................. G06F 9/526 719/319 |
| 2010/0031325 A1* | 2/2010 | Maigne et al. ................. 726/4 |
| 2010/0052844 A1 | 3/2010 | Wesby |
| 2010/0075669 A1 | 3/2010 | Sparks et al. |
| 2010/0077487 A1 | 3/2010 | Travis et al. |
| 2010/0082977 A1 | 4/2010 | Boyle et al. |
| 2010/0125512 A1 | 5/2010 | Jones et al. |
| 2010/0125904 A1* | 5/2010 | Nice et al. ..................... 726/16 |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0263029 A1 | 10/2010 | Tohmo et al. |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1* | 12/2010 | Rogel ........................ 340/540 |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0030030 A1 | 2/2011 | Terpening et al. |
| 2011/0035604 A1 | 2/2011 | Habraken |
| 2011/0050713 A1 | 3/2011 | McCrary et al. |
| 2011/0055084 A1 | 3/2011 | Singh |
| 2011/0063093 A1 | 3/2011 | Fung et al. |
| 2011/0072492 A1 | 3/2011 | Mohler et al. |
| 2011/0078081 A1 | 3/2011 | Pirzadeh et al. |
| 2011/0082711 A1 | 4/2011 | Poeze et al. |
| 2011/0107426 A1* | 5/2011 | Yen et al. ..................... 726/26 |
| 2011/0112968 A1 | 5/2011 | Florek et al. |
| 2011/0113479 A1 | 5/2011 | Ganem |
| 2011/0130635 A1 | 6/2011 | Ross |
| 2011/0138064 A1 | 6/2011 | Rieger et al. |
| 2011/0145923 A1 | 6/2011 | Largman et al. |
| 2011/0145926 A1 | 6/2011 | Dalcher et al. |
| 2011/0151836 A1 | 6/2011 | Dadu et al. |
| 2011/0154032 A1 | 6/2011 | Mauro, II |
| 2011/0166883 A1 | 7/2011 | Palmer et al. |
| 2011/0173090 A1 | 7/2011 | Miller et al. |
| 2011/0202916 A1 | 8/2011 | VoBa et al. |
| 2011/0208797 A1 | 8/2011 | Kim |
| 2011/0212707 A1 | 9/2011 | Mahalal |
| 2011/0216701 A1 | 9/2011 | Patel et al. |

(56) References Cited

U.S. PATENT DOCUMENTS

| | | |
|---|---|---|
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0254687 A1 | 10/2011 | Arponen et al. |
| 2011/0258462 A1 | 10/2011 | Robertson et al. |
| 2011/0269456 A1 | 11/2011 | Krishnaswamy et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1* | 1/2012 | Sallam ............ 726/24 |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0040662 A1 | 2/2012 | Rahman et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0079100 A1 | 3/2012 | McIntyre et al. |
| 2012/0083242 A1 | 4/2012 | Spitz et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0149338 A1 | 6/2012 | Roundtree |
| 2012/0150601 A1 | 6/2012 | Fisher |
| 2012/0154413 A1 | 6/2012 | Kim et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0191536 A1 | 7/2012 | Chen et al. |
| 2012/0196529 A1 | 8/2012 | Huomo et al. |
| 2012/0196586 A1 | 8/2012 | Grigg et al. |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1* | 10/2012 | Sallam ............ 726/24 |
| 2012/0258690 A1 | 10/2012 | Chen et al. |
| 2012/0259722 A1 | 10/2012 | Mikurak |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0282924 A1 | 11/2012 | Tagg et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0297202 A1 | 11/2012 | Gallet et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2012/0329425 A1 | 12/2012 | Velusamy et al. |
| 2013/0003543 A1 | 1/2013 | Ludwig |
| 2013/0014259 A1 | 1/2013 | Gribble et al. |
| 2013/0019323 A1 | 1/2013 | Arvidsson et al. |
| 2013/0031374 A1* | 1/2013 | Thom et al. .......... 713/189 |
| 2013/0034081 A1 | 2/2013 | Ban et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0074067 A1 | 3/2013 | Chowdhry |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0097657 A1 | 4/2013 | Cardamore et al. |
| 2013/0105565 A1 | 5/2013 | Kamprath |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0124583 A1 | 5/2013 | Ferguson et al. |
| 2013/0125114 A1 | 5/2013 | Frascadore |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159021 A1 | 6/2013 | Felsher |
| 2013/0159186 A1 | 6/2013 | Brudnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0175984 A1 | 7/2013 | Yamazaki et al. |
| 2013/0191632 A1 | 7/2013 | Spector et al. |
| 2013/0212704 A1 | 8/2013 | Shablygin et al. |
| 2013/0231098 A1 | 9/2013 | Jonas et al. |
| 2013/0262264 A1 | 10/2013 | Karstoft |
| 2013/0263212 A1 | 10/2013 | Faltyn et al. |
| 2013/0290709 A1 | 10/2013 | Muppidi et al. |
| 2013/0305333 A1 | 11/2013 | Katzer et al. |
| 2013/0310003 A1 | 11/2013 | Sadhvani et al. |
| 2013/0313314 A1 | 11/2013 | Jeng et al. |
| 2013/0331067 A1 | 12/2013 | Coussemaeker et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347064 A1 | 12/2013 | Aissi |
| 2013/0347103 A1 | 12/2013 | Veteikis et al. |
| 2014/0007182 A1 | 1/2014 | Qureshi et al. |
| 2014/0007222 A1 | 1/2014 | Qureshi et al. |
| 2014/0033316 A1 | 1/2014 | Paczkowski et al. |
| 2014/0047548 A1 | 2/2014 | Bye et al. |
| 2014/0059642 A1 | 2/2014 | Deasy et al. |
| 2014/0074508 A1 | 3/2014 | Ying et al. |
| 2014/0089243 A1 | 3/2014 | Oppenheimer |
| 2014/0089699 A1 | 3/2014 | O'Connor et al. |
| 2014/0104287 A1 | 4/2014 | Nalluri et al. |
| 2014/0106709 A1 | 4/2014 | Palamara et al. |
| 2014/0141718 A1 | 5/2014 | Stromberg et al. |
| 2014/0155025 A1 | 6/2014 | Parker et al. |
| 2014/0173747 A1 | 6/2014 | Govindaraju |
| 2014/0188412 A1 | 7/2014 | Mahajan et al. |
| 2014/0188738 A1 | 7/2014 | Huxham |
| 2014/0215196 A1* | 7/2014 | Berlin ................ 713/2 |
| 2014/0245444 A1* | 8/2014 | Lutas et al. ............ 726/24 |
| 2014/0254381 A1 | 9/2014 | Racz et al. |
| 2014/0267332 A1 | 9/2014 | Chhabra et al. |
| 2014/0279556 A1 | 9/2014 | Priebatsch et al. |
| 2014/0279558 A1 | 9/2014 | Kadi et al. |
| 2014/0281544 A1 | 9/2014 | Paczkowski et al. |
| 2014/0298026 A1 | 10/2014 | Isozaki et al. |
| 2015/0106805 A1 | 4/2015 | Melander et al. |
| 2015/0169885 A1 | 6/2015 | Paczkowski et al. |
| 2015/0172928 A1 | 6/2015 | Katzer et al. |
| 2016/0004876 A1 | 1/2016 | Bye et al. |
| 2016/0142396 A1 | 5/2016 | McRoberts et al. |

(56) References Cited

U.S. PATENT DOCUMENTS

FOREIGN PATENT DOCUMENTS

| WO | WO 2012064171 A1 * | 5/2012 |
| --- | --- | --- |
| WO | WO2012085593 A1 | 6/2012 |
| WO | 2013170228 A2 | 11/2013 |
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
Notice of Allowance dated Dec. 3, 2014, U.S. Appl. No. 13/594,777, filed Aug. 25, 2012.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.
Foreign Communication from a Related Counterpart—International Preliminary Report on Patentability, dated Jan. 8, 2015, PCT/US13/47729, filed on Jun. 25, 2013.
Foreign Communication from a Related Counterpart—International Preliminary Report on Patentability, dated Feb. 19, 2015, PCT/US13/53617, filed on Aug. 5, 2013.
Foreign Communication from a Related Counterpart—International Preliminary Report on Patentability, dated Feb. 5, 2015, PCT/US13/51750, filed on Jul. 24, 2013.
Katzer, Robin D., et al., "Web Server Bypass of Backend Process on Near Field Communications and Secure Elements Chips", filed Feb. 26, 2015, U.S. Appl. No. 14/632,850.
Neson, Tracy L., et al., "Mated Universal Serial Bus (USB) Wireless Dongles Configured with Destination Addresses", filed Jan. 26, 2015, U.S. Appl. No. 14/606,011.
Paczkowski, Lyle W., et al., "Trusted Code Generation and Verification to Prevent Fraud from Maleficent External Devices that Capture Data", filed Jan. 14, 2015, U.S. Appl. No. 14/592,218.
FAIPP Pre-Interview Communication dated Mar. 20, 2014, U.S. Appl. No. 13/482,731, filed May 29, 2012.
Final Office Action dated Mar. 27, 2014, U.S. Appl. No. 13/470,203, filed May 11, 2012.
Notice of Allowance dated Jan. 28, 2014, U.S. Appl. No. 12/486,873, filed Jun. 18, 2009.
Paczkowski, Lyle W., et al., "Trusted Security Zone Access to Peripheral Devices", filed Jan. 6, 2014, U.S. Appl. No. 14/148,714.
FAIPP Pre-Interview Communication dated Mar. 25, 2015, U.S. Appl. No. 13/532,588, filed Jun. 25, 2012.
FAIPP Pre-Interview Communication dated Mar. 10, 2015, U.S. Appl. No. 13/762,319, filed Feb. 7, 2013.
FAIPP Pre-Interview Communication dated May 21, 2015, U.S. Appl. No. 14/090,667, filed Nov. 26, 2013.
Final Office Action dated Apr. 7, 2015, U.S. Appl. No. 13/844,145, filed Mar. 15, 2013.
FAIPP Pre-Interview Communication dated Mar. 26, 2015, U.S. Appl. No. 13/939,175, filed Jul. 10, 2013.
Final Office Action dated Mar. 24, 2015, U.S. Appl. No. 13/844,282, filed Mar. 15, 2013.
FAIPP Pre-Interview Communication dated Mar. 24, 2015, U.S. Appl. No. 13/964,112, filed Aug. 12, 2013.
FAIPP Pre-Interview Communication dated Apr. 15, 2015, U.S. Appl. No. 14/085,474, filed Nov. 20, 2013.
First Action Interview Office Action dated Apr. 10, 2015, U.S. Appl. No. 14/075,663, filed Nov. 8, 2013.
Notice of Allowance dated Apr. 9, 2015, U.S. Appl. No. 14/163,047, filed Jan. 24, 2014.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Bertz, Lyle T., et al., "Framework for Real-Time Brokering of Digital Content Delivery," filed Mar. 17, 2015, U.S. Appl. No. 14/659,614.
Marquard, et al., "Infrastructure for Secure Short Message Transmission," filed Apr. 7, 2015, U.S. Appl. No. 14/681,077.
Notice of Allowance dated May 29, 2015, U.S. Appl. No. 14/085,474, filed Nov. 20, 2013.
Notice of Allowance dated May 27, 2014, U.S. Appl. No. 13/482,731, filed May 29, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
Final Office Action dated Apr. 10, 2014, U.S. Appl. No. 13/571,348, filed Aug. 10, 2012.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Foreign Communication from a Related Counterpart—International Search Report and Written Opinion, dated Apr. 22, 2014, PCT/US13/53617, filed on Aug. 5, 2013.
Advisory Action dated Jun. 23, 2014, U.S. Appl. No. 13/571,348, filed Aug. 10, 2012.
Notice of Allowance dated Jun. 4, 2014, U.S. Appl. No. 13/557,213, filed Jul. 25, 2012.
FAIPP Pre-Interview Communication dated Aug. 4, 2014, U.S. Appl. No. 13/844,357, filed Mar. 15, 2013.
Notice of Allowance dated Jul. 8, 2014, U.S. Appl. No. 13/802,383, filed Mar. 13, 2013.
Restriction Requirement dated Aug. 14, 2014, U.S. Appl. No. 13/594,777, filed Aug. 25, 2012.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
Ahmed, Farid, et al., "Correlation-based Watermarking Method for Imagine Authentication Applications", Society of Photo-Optical Instrumentation Engineers, Feb. 17, 2004, pp. 1834-1838.
Foreign Communication from a Related Counterpart—International Search Report and Written Opinion, dated Jul. 11, 2014, PCT/US14/16651, filed on Feb. 16, 2014.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.

(56) References Cited

OTHER PUBLICATIONS

Bertz, Lyle T., et al., "Framework for Real-Time Brokering of Digital Content Delivery," filed Aug. 25, 2012, U.S. Appl. No. 13/594,777.
Bertz, Lyle T., et al.,"Reservations in Real-Time Brokering of Digital Content Delivery," filed Aug. 25, 2012, U.S. Appl. No. 13/594,778.
Bertz, Lyle T., et al., "File Retrieval in Real-Time Brokering of Digital Content Delivery," filed Aug. 25, 2012, U.S. Appl. No. 13/594,779.
Paczkowski, Lyle W., et al., "Trusted Security Zone Watermark", filed Mar. 5, 2013, U.S. Appl. No. 13/786,450.
Paczkowski, Lyle W., et al., "Trusted Processing Location Within a Graphics Processing Unit", filed Jul. 10, 2013, U.S. Appl. No. 13/939,175.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
FAIPP Pre-Interview Communication dated Jun. 6, 2013, U.S. Appl. No. 13/571,348, filed Aug. 10, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Cope, Warren B., et al., "Electronic Purchase Transaction Trust Infrastructure", filed May 29, 2012, U.S. Appl. No. 13/482,731.
Cope, Warren B., et al., "Alternative hardware and Software Configuration for Near Field Communication", filed May 4, 2012, U.S. Appl. No. 13/463,797.
Cope, Warren B., et al., "Multiple Secure Elements in Mobile Electronic Device with Near Field Communication Capability", filed Apr. 5, 2012, U.S. Appl. No. 13/440,980.
Bye, Stephen James, et al., "Near Field Communication Authentication and Validation to Access Corporate Data", filed May 3, 2012, U.S. Appl. No. 13/463,801.
Katzer, Robin D., et al., "Web Server Bypass of Backend Process on Near Field Communications and Secure Elements Chips", filed May 11, 2012, U.S. Appl. No. 13/470,203.
Katzer, Robin D., et al., "Web Server Bypass of Backend Process on Near Field Communications and Secure Elements Chips", filed May 10, 2013, PCT Application No. PCT/US13/40673.
Katzer, Robin D., et al., "Secure Placement of Centralized Media Controller Application in Mobile Access Terminal ", filed Nov. 11, 2011, U.S. Appl. No. 13/294,177.
McRoberts, Leo Michael, et al., "End-to-End Trusted Communications Infrastructure", filed Jun. 25, 2012, U.S. Appl. No. 13/532,588.
McRoberts, Leo Michael, et al., "End-to-End Trusted Communications Infrastructure", filed on Jun. 25, 2013, PCT Serial. No. PCT/US13/47729.
Paczkowski, Lyle W., et al., "Trusted Policy and Charging Enforcement Function", filed Jun. 27, 2012, U.S. Appl. No. 13/533,969.
Bye, Stephen James, et al., "Systems and Methods for Provisioning and Using Multiple Trusted Security Zones on an Electronic Device", filed Aug. 10, 2012, U.S. Appl. No. 13/571,348.
Bye, Stephen James, et al., "Systems and Methods for Provisioning and Using Multiple Trusted Security Zones on an Electronic Device", filed on Aug. 5, 2013, PCT Serial No. PCT/US13/53617.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Jul. 2, 2012, U.S. Appl. No. 13/540,437.
Katzer, Robin D., et al., "Trusted Access to Third Party Applications Systems and Methods", filed Jul. 25, 2012, U.S. Appl. No. 13/557,213.
Paczkowski, Lyle W., et al., "System and Methods for Trusted Internet Domain Networking", filed Sep. 11, 2012, U.S. Appl. No. 13/610,856.
Paczkowski, Lyle W., et al., "Trusted Security Zone Access to Peripheral Devices", filed Jul. 24, 2012, U.S. Appl. No. 13/556,200.
Paczkowski, Lyle W., et al., "Trusted Security Zone Access to Peripheral Devices", filed Jul. 24, 2013, PCT Application No. PCT/US13/51750.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.

(56) References Cited

OTHER PUBLICATIONS

Paczkowski, Lyle W., et al., "Trusted Security Zone Containers for the Protection and Confidentiality of Trusted Service Manager Data", filed Mar. 14, 2013, U.S. Appl. No. 13/831,463.
Bye, Stephen James, et al., "Delivering Digital Content to a Mobile Device via a Digital Rights Clearing House", filed Apr. 10, 2013, U.S. Appl. No. 13/860,338.
Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Verifying Applications Using a Trusted Security Zone", filed Aug. 12, 2013, U.S. Appl. No. 13/964,112.
Paczkowski, Lyle W., et al., "Mobile Access Terminal with Local Call Session Control Function", filed Jun. 18, 2009, U.S. Appl. No. 12/486,873.
Zimmerman, Ann, "Check Out the Future of Shopping", The Wall Street Journal, Business, May 18, 2011, http://online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber= 1617569.
Final Office Action dated Sep. 9, 2013, U.S. Appl. No. 13/440,980, filed Apr. 5, 2012.
Office Action dated Sep. 25, 2013, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Notice of Allowance dated Oct. 16, 2013, U.S. Appl. No. 13/556,200, filed Jul. 24, 2012.
Notice of Allowance dated Nov. 29, 2013, U.S. Appl. No. 13/440,980, filed Apr. 5, 2012.
Office Action dated Dec. 19, 2013, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
Cope, Warren B., et al., "Extended Trusted Security Zone Radio Modem", filed Nov. 26, 2013, U.S. Appl. No. 14/090,667.
Paczkowski, Lyle W., et al., "Trusted Security Zone Containers for the Protection and Confidentiality of Trusted Service Manager Data", filed Feb. 16, 2014, PCT Application No. PCT/US14/16651.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
FAIPP Pre-Interview Communication dated Jul. 2, 2015, U.S. Appl. No. 14/632,850, filed Feb. 26, 2015.
Notice of Allowance dated Jun. 17, 2015, U.S. Appl. No. 13/571,348, filed Aug. 10, 2012.
Notice of Allowance dated Jun. 9, 2015, U.S. Appl. No. 13/762,319, filed Feb. 7, 2013.
Notice of Allowance dated Aug. 4, 2015, U.S. Appl. No. 14/090,667, filed Nov. 26, 2013.
Notice of Allowance dated Jul. 6, 2015, U.S. Appl. No. 13/844,145, filed Mar. 15, 2013.
Notice of Allowance dated Jul. 6, 2015, U.S. Appl. No. 14/066,661, filed Oct. 29, 2013.
Notice of Allowance dated Aug. 14, 2015, U.S. Appl. No. 13/594,779, filed Aug. 25, 2012.
Notice of Allowance dated Jul. 7, 2015, U.S. Appl. No. 13/939,175, filed Jul. 10, 2013.
Advisory Action dated Jun. 10, 2015, U.S. Appl. No. 13/844,282, filed Mar. 15, 2013.
Office Action dated Aug. 24, 2015, U.S. Appl. No. 13/844,282, filed Mar. 15, 2013.
Notice of Allowance dated Aug. 3, 2015, U.S. Appl. No. 13/964,112, filed Aug. 12, 2013.
Notice of Allowance dated Jul. 1, 2015, U.S. Appl. No. 14/075,663, filed Nov. 8, 2013.
Notice of Allowance dated Jul. 22, 2015, U.S. Appl. No. 14/229,532, filed Mar. 28, 2014.
Notice of Allowance dated Aug. 28, 2015, U.S. Appl. No. 14/446,330, filed Jul. 29, 2014.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139, filed Apr. 4, 2013.
Notice of Allowance dated Jun. 11, 2015, U.S. Appl. No. 13/857,138, filed Apr. 4, 2013.
Henderson, Tristan, et al., "On the Wire, Congestion Pricing: Paying Your Way in Communications Networks," University College London, Sep./Oct. 2001, retrieved from: http://tristan.host.cs.st-andrews.ac.uk!research/pubs/ieeeic01.pdf.
Final Office Action dated Nov. 6, 2015, U.S. Appl. No. 14/632,850, filed Feb. 26, 2015.
FAIPP Office Action Sep. 15, 2015, U.S. Appl. No. 13/532,588, filed Jun. 25, 2012.
Notice of Allowance dated Nov. 5, 2015, U.S. Appl. No. 13/532,588, filed Jun. 25, 2012.
Supplemental Notice of Allowance dated Nov. 16, 2015, U.S. Appl. No. 13/532,588, filed Jun. 25, 2012.

(56) References Cited

OTHER PUBLICATIONS

Notice of Allowance dated Sep. 21, 2015, U.S. Appl. No. 14/148,714, filed Jan. 6, 2014.
Notice of Allowance dated Nov. 9, 2015, U.S. Appl. No. 14/659,614, filed Mar. 17, 2015.
FAIPP Pre-Interview Communication dated Nov. 18, 2015, U.S. Appl. No. 14/681,077, filed Apr. 7, 2015.
Office Action dated Nov. 19, 2015, U.S. Appl. No. 13/857,139, filed Apr. 4, 2013.
Foreign Communication from a Related Counterpart—International Preliminary Report on Patentability, dated Sep. 24, 2015, PCT/US14/16651, filed on Feb. 16, 2014.
Bye, Stephen James, et al., "Systems and Methods for Provisioning and Using Multiple Trusted Security Zones on an Electronic Device," filed Sep. 15, 2015, U.S. Appl. No. 14/855,364.
Advisory Action dated Jan. 29, 2016, U.S. Appl. No. 14/632,850, filed Feb. 26, 2015.
FAIPP Pre-Interview Communication dated Mar. 1, 2016, U.S. Appl. No. 13/863,376, filed Apr. 15, 2013.
Notice of Allowance dated Feb. 26, 2016, U.S. Appl. No. 13/844,282, filed Mar. 15, 2013.
Restriction Requirement dated Jan. 12, 2016, U.S. Appl. No. 13/912,190, filed Jun. 6, 2013.
FAIPP Pre-Interview Communication dated Mar. 11, 2016, U.S. Appl. No. 13/912,190, filed Jun. 6, 2013.
Notice of Allowance dated Dec. 17, 2015, U.S. Appl. No. 13/857,141, filed Apr. 4, 2013.
Dietrich, Kurt, et al., "Implementation Aspects of Mobile and Embedded Trusted Computing," Institute for Applied Information Processing and Communications, Trusted Computing Interaction Conference, 2009.
McRoberts, Leo Michael, et al., "End-to-End Trusted Communications Infrastructure," filed Jan. 25, 2016, U.S. Appl. No. 15/005,123.
Cordes, Kevin R., et al., "Digest of Biographical Information for an Electronic Device with Static and Dynamic Portions," filed Mar. 14, 2016, U.S. Appl. No. 15/069,921.
European Examination Report dated Mar. 3, 2016, EPC Application Serial No. , filed on.
Notice of Allowance dated May 2, 2016, U.S. Appl. No. 13/863,376, filed Apr. 15, 2013.
First Action Interview Office Action dated Mar. 28, 2016, U.S. Appl. No. 14/681,077, filed Apr. 7, 2015, Nov. 13, 2016.
Notice of Allowance dated Mar. 26, 2016, U.S. Appl. No. 13/857,139, filed Apr. 4, 2013.
European Examination Report dated Jun. 1, 2016, EPC Application Serial No. 14775613.4, filed on Jul. 8, 2015.
Office Action dated Aug. 25, 2016, U.S. Appl. No. 13/860,338, filed Apr. 10, 2013.
Notice of Allowance dated Aug. 24, 2016, U.S. Appl. No. 13/912,190, filed Jun. 6, 2013, Nov. 13, 2016.
FAIPP Pre-Interview Communication dated Aug. 8, 2016, U.S. Appl. No. 14/596,218, filed Jan. 14, 2015.
Notice of Allowance dated Jun. 15, 2016, U.S. Appl. No. 14/681,077, filed Apr. 7, 2015.
Eastlake, 3rd Motorola labs T Hansen AT&T Labs D: "US Secure Hash Algorithms," MPEG Meeting Mar. 16, 2011 to Mar. 23, 2011, Geneva, XP15047395A, ISSN: 0000-0003.
Hamdare, Safa, et al., "Securing SMS Based One Time Password Technique from Man in the Middle Attach," IJETT, vol. 11 Issue 3, May 2014.
Examiner's Answer dated Nov. 16, 2016, U.S. Appl. No. 14/632,850, filed Feb. 26, 2015.
FAIPP Pre-Interview Communication dated Oct. 5, 2016, U.S. Appl. No. 15/069,921, filed Mar. 14, 2016.
McCracken, Billy Gene, Jr., et al. "Mobile Communication Device Profound Identity Brokering Framework", filed Nov. 30, 2016, U.S. Appl. No. 15/365,934.

\* cited by examiner

TRUSTED SECURITY ZONE ENHANCED WITH TRUSTED HARDWARE DRIVERS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices in the future are expected to store or embody a variety of applications that may interact with confidential information such as credit card numbers, bank account numbers, authentication numbers, personal data, medical information, and the like. Additionally, electronic devices may promote users installing after market applications that may be infiltrated by malware such as viruses, Trojans, screen scrapers, keyboard monitors, and other nefarious software and/or firmware.

SUMMARY

In an embodiment, an electronic device is disclosed. The electronic device comprises a processor, a permissive sector, a trusted security zone that is separate from the permissive sector, a hardware driver, and a first trusted application stored in the trusted security zone that is configured to invoke the hardware driver in response to activation instructions. The electronic device further comprises a second trusted application stored in the trusted security zone that, when executed on the processor, configures the processor to: amass information about an uncompromised state of the hardware driver, store the information about the uncompromised state of the hardware driver in the trusted security zone, compare, in response to receipt of activation instructions by the first trusted application, the information about the uncompromised state of the hardware driver with a current state of the hardware driver, and perform an action in response to a result of the comparison.

In an embodiment, a method is disclosed. The method comprises activating an application stored in a trusted security zone of the electronic device, wherein the application is configured to invoke a hardware driver. The method further comprises performing, in response to activating the application, a confidence check of the hardware driver, comparing a current state of the hardware driver with an uncompromised state of the hardware driver stored in the trusted security zone of the electronic device, evaluating, in the electronic device, the integrity of the hardware driver based on the comparing, and performing, by the electronic device, an action in response to the result of the evaluating.

In an embodiment, an electronic device is disclosed. The electronic device comprises a permissive sector, a trusted security zone that is separate from the permissive sector, a trusted version of a hardware driver stored in the trusted security zone, a version of the hardware driver stored in the permissive sector of the electronic device, and a first trusted application stored in the trusted security zone and configured to invoke the hardware driver in response to activation instructions. The electronic device further comprises a second trusted application stored in the trusted security zone and configured to: compare, in response to instructions directing the first trusted application to invoke the version of the hardware driver stored in the permissive sector, the trusted version of the hardware driver with the version of the hardware driver stored in the permissive sector, and enable the electronic device to perform an action in response to a result of the comparison.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
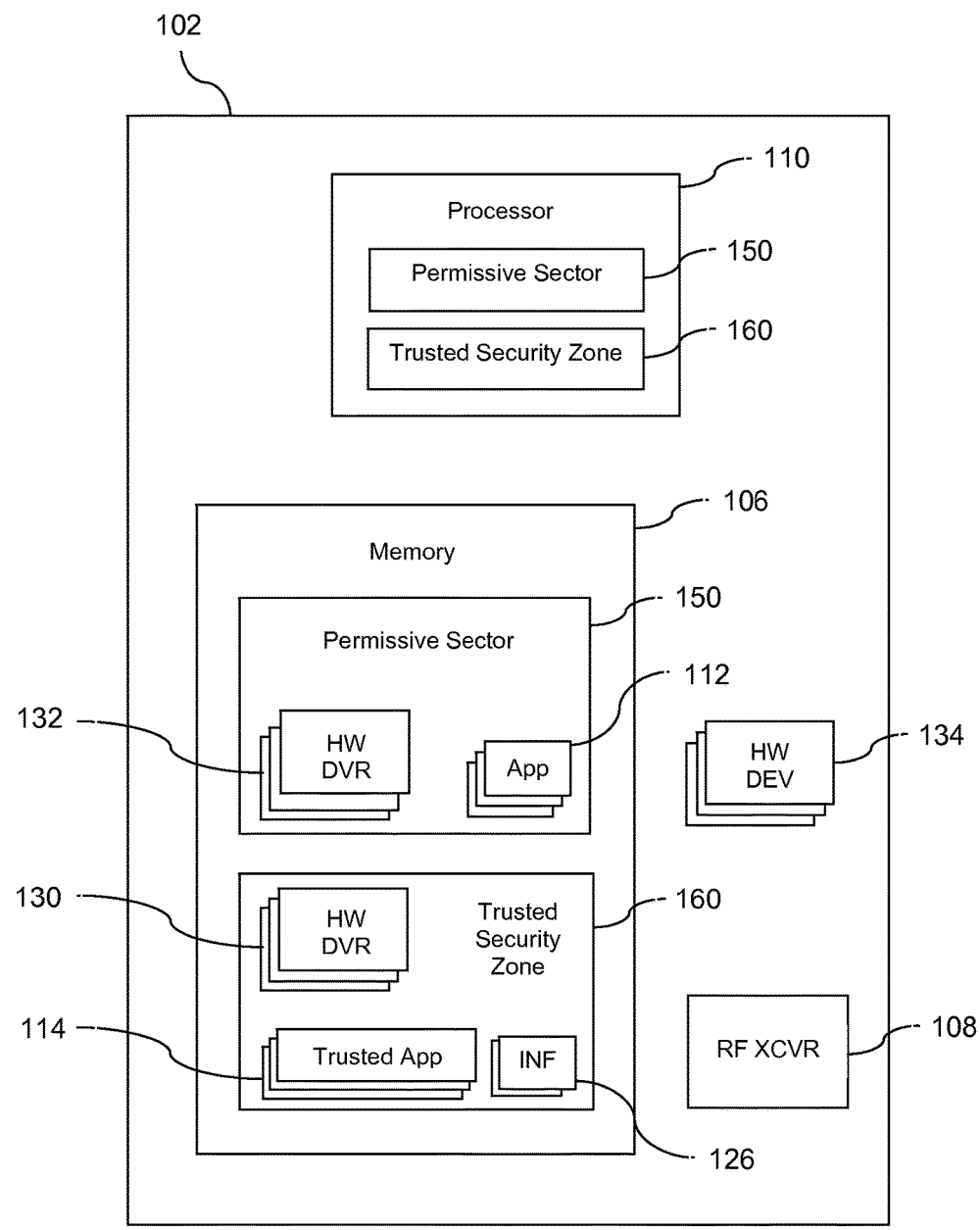
FIG. 1 is an illustration of an electronic device according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, an electronic device that implements trusted hardware drivers is described. The electronic device may be a mobile device such as a mobile phone, a personal digital assistant, a media player, or other mobile device that implements hardware drivers. Alternatively, the electronic device may be a desktop computer, a laptop computer, a notebook computer, or other computer that implements hardware drivers. The electronic device comprises a trusted security zone. As described further below, trusted security zones reduce the ability of nefarious applications and/or programs that may have infiltrated the electronic device to read from or write to memory, to read from or write to input/output devices, or to read from or write to communication ports while the subject processor and/or electronic device is executing in the trusted security zone. An application executing in the trusted security zone can have a high level of confidence that an untrusted application is not executing on the electronic device at the same time and hence is prevented from interfering with or monitoring the activities of the application.

In order to interact with peripheral hardware, the electronic device may invoke a corresponding driver. The driver may be a device driver, a hardware driver, or some other driver. It should be understood at the outset that while several embodiments of the present disclosure are discussed with reference to hardware drivers, the use of the term "hardware driver" is not intended to limit the scope of the present disclosure rather, the systems and methods disclosed herein may encompass all manner of drivers configured to facilitate communication between the electronic device and peripheral components.

The electronic device may comprise a plurality of hardware drivers corresponding to a plurality of peripheral hardware components. As is known to one skilled in the art, hardware drivers are software programs that mediate between peripheral hardware and a processor. Hardware drivers may be configured to mediate between a processor of the electronic device and peripheral components including printers, video adaptors, network cards, sound cards, local buses, low bandwidth I/O buses, computer storage devices, digital cameras, key boards, monitors, displays, speakers, mice, and/or other peripheral hardware devices.

In an embodiment, applications executing in the trusted security zone may invoke hardware drivers in order to interact with peripheral hardware components. Hardware drivers may be subject to infiltration or attack by nefarious programs. Thus, allowing a trusted application to invoke a non-trusted hardware driver may compromise the environment of trust afforded by the trusted security zone. In order to preserve the integrity of the trusted security zone, hardware drivers to be invoked by trusted applications may be established in trust or may be verified to be trusted. The electronic device may store a plurality of hardware drivers in the trusted security zone that may be readily invoked by trusted applications. Alternatively, the electronic device may perform a confidence check on hardware drivers stored in a permissive sector and/or in the trusted security zone before allowing them to be invoked by trusted applications.

In an embodiment, the electronic device may perform a confidence check on a hardware driver stored either in the permissive sector or in the trusted security zone in response to activating a trusted application and may respond to a result of the confidence check. If the confidence check indicates that the hardware driver is uncompromised, the electronic device may allow the trusted application to invoke the hardware driver and continue its action. Conversely, if the confidence check indicates that the hardware driver has been compromised, corrupted, or otherwise modified, the electronic device may prevent the trusted application from invoking the hardware driver.

A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone. It is anticipated that implementing trusted hardware drivers will further fortify the trusted security zone against nefarious programs.

Turning now to FIG. 1, an electronic device 102 is described. In an embodiment, the electronic device 102 comprises a memory 106, a radio frequency transceiver (RF XCVR) 108, a processor 110, a plurality of peripheral hardware devices (HW DEV) 134, a permissive sector 150, and a trusted security zone 160. The memory 106 may be partitioned into the permissive sector 150 and the trusted security zone 160. The permissive sector may comprise a plurality of non-trusted applications 112, a plurality of hardware drivers (HW DVR) 132, and/or other non-trusted information. The trusted security zone 160 may comprise a plurality of trusted applications 114, trusted information (INF) 126, a plurality of trusted hardware drivers (HW DVR) 130, and/or other items stored in trust. As discussed hereinabove with reference to trusted security zones, the hardware and software components of the electronic device 102 may be partitioned into permissive sectors and trusted security zones. For example, the processor 110 may be divided into the permissive sector 150 and the trusted security zone 160.

In an embodiment, the processor 110 may be a multi-core processor, for example a dual core or quad core processor, wherein the permissive sector 150 and the trusted security zone 160 reside in separate cores. FIG. 1 shows the processor 110 as a single processor, but it should be understood that the electronic device 102 may comprise multiple processors, and these processors may comprise a substantially similar separation of the permissive sector 150 and the trusted security zone 160. Alternatively, when the electronic device 102 comprises multiple processors, each processor may be designated as being either wholly in the permissive sector 150 or wholly in the trusted security zone 160. Similar to their depiction in the processor 110, the permissive sector 150 and the trusted security zone 160 are depicted as sharing the memory 106 in FIG. 1. The permissive sector 150 and the trusted security zone 160 may occur as separate partitions of a single memory chip, or they may occur in physically separate chips.

In an embodiment, the plurality of hardware drivers 132 and the plurality of trusted hardware drivers 130 may each comprise drivers for a printer, a video adaptor, a network card, a sound card, a local bus, low bandwidth I/O buses, a computer storage device, a digital camera, a key board, a monitor, a display, speakers, mice, and/or other drivers. The plurality of peripheral hardware devices 134 may comprise a printer, a video adaptor, a network card, a sound card, a local bus, a low bandwidth I/O bus, a computer storage device, a digital camera, a key board, a monitor, a display, speakers, mice, and/or other peripheral hardware devices.

In an embodiment, the non-trusted applications 112 may invoke the hardware drivers 132 in order to interact with the peripheral hardware devices 134. In an embodiment, the trusted applications 114 stored in the trusted security zone 160 may also interact with the peripheral hardware devices 134. When one of the trusted applications 114 is activated, activity in the permissive sector 150 ceases until all operations in the trusted security zone 160 terminate in order to limit nefarious programs from breaching the trusted security zone 160. The trusted applications 114 may invoke either the hardware drivers 132 or the trusted hardware drivers 130 to facilitate interaction with the peripheral hardware devices 134. In an embodiment, the trusted applications 114 may make calls in the trusted security zone 160 for access to the trusted hardware drivers 130 in response to receipt of instructions for use of the peripheral hardware devices 134. Alternatively, the trusted applications 114 may invoke the hardware drivers 132 after their integrity is confirmed.

A first trusted application 114 of the trusted applications 114 may be configured to invoke either one of the hardware drivers 132 or one of the trusted hardware drivers 130 in response to activation instructions. Or, in some cases, the first trusted application 114 may be configured to invoke a plurality of the hardware drivers 132 and/or the trusted hardware drivers 130 in response to activation instructions. In an embodiment, the electronic device 102 may perform a confidence check on the hardware drivers 132 and/or the trusted hardware drivers 130 in response to activation of the first trusted application 114 and/or in response to being powered on. The electronic device 102 may be configured to perform the confidence check on the hardware drivers 132 that are to be invoked by the first trusted application 114, the trusted hardware drivers 130 that are to be invoked by the first trusted application 114, all of the hardware drivers 132, or to perform the confidence check on a combination of the hardware drivers 132 and the trusted hardware drivers 130. In an embodiment, the electronic device 102 may be configured to allow the first trusted application 114 to invoke the trusted hardware drivers 130 without performing the confidence check.

The confidence check may comprise performing an error detection action such as a checksum, a bit count of the hardware driver, a cyclic redundancy check, a repetition code check, a horizontal redundancy check, a vertical redundancy check, checking information about a parity bit, checking a digital signature, performing a cryptographic hash function, or performing another type of check configured to evaluate the integrity of the hardware drivers 132 and/or the trusted hardware drivers 130. In an embodiment, a second trusted application 114 of the trusted applications 114 may be configured to amass information about an uncompromised state of the hardware drivers 132 and/or the trusted hardware drivers 130 and store the information as trusted information 126 in the trusted security zone 160 for use when the electronic device 102 performs the confidence check.

The uncompromised state of the hardware drivers 132 and the trusted hardware drivers 130 may be a state that is free from sniffers, malware, Trojans, spyware, viruses, and other nefarious programs. The hardware drivers 132 and the trusted hardware drivers 130 may be obtained in the uncompromised state and have information about their uncompromised state stored, by the second trusted application 114, as trusted information 126 in the trusted security zone 160 of the memory 106 upon their installation in the electronic device 102. Information about the uncompromised state of the hardware drivers 132 and the trusted hardware drivers 130 may comprise information to be used in the confidence check. For example, the information may be information about an error detection action such as a checksum, a bit count of the hardware driver, information about a cyclic redundancy check, information about a repetition code, information about a horizontal redundancy check, information about a vertical redundancy check, information about a parity bit, a digital signature, or information about a cryptographic hash function. In the case of a checksum, the second trusted application 114 may obtain a checksum value for the uncompromised state of the trusted hardware drivers 130 and/or the hardware drivers 132 and store the value in the trusted security zone 160.

In an embodiment, the electronic device 102 may activate the second trusted application 114 to perform the confidence check in response to receipt of activation instructions by the first trusted application 114. The confidence check may comprise comparing the information about the uncompromised state of a hardware driver to be invoked by the first trusted application 114 with a current state of the hardware driver in question, wherein the hardware driver in question may be either one of the hardware drivers 132 or one of the trusted hardware drivers 130. The current state may be the state of the hardware driver in question before it is invoked and after the first trusted application 114 has received activation instructions. The comparison may comprise comparing a checksum value obtained for the uncompromised state of the hardware driver in question with a checksum value obtained for the current state of said hardware driver. Alternatively, the comparison may comprise comparing results of an error detection action performed on the uncompromised state and the current state of the hardware driver in question as described hereinabove with reference to the confidence check or it may comprise comparing results from another error detection action performed by the electronic device 102.

In an embodiment, the electronic device 102 may be configured to respond to a result of the comparison between the current state and the uncompromised state of the hardware driver in question. The response may be to allow the first trusted application 114 to invoke the hardware driver in question in response to the result when the result indicates that the current state of the hardware driver in question corresponds to the uncompromised state of the hardware driver in question. The uncompromised state and the current state of the hardware driver in question may be said to correspond if the comparison indicates that the current state of the hardware driver in question is unaltered from the uncompromised state of the hardware driver in question. In this case, the electronic device 102 may have confidence that the trusted security zone 160 will not be compromised by allowing the first trusted application 114 to invoke the hardware driver in question when the result indicates that the two states of the hardware driver in question correspond.

Alternatively, the electronic device 102 may respond by replacing the current state of the hardware driver in question with the uncompromised state of the hardware driver in question, the electronic device 102 may prevent the first trusted application 114 from invoking the hardware driver in question, and/or prompt the user with options in response to the result when the result indicates that the current state of the hardware driver in question does not correspond to the uncompromised state of the hardware driver in question. The electronic device 102 may enact this response in order to inhibit nefarious programs from corrupting the trusted security zone 160.

Figure 2:
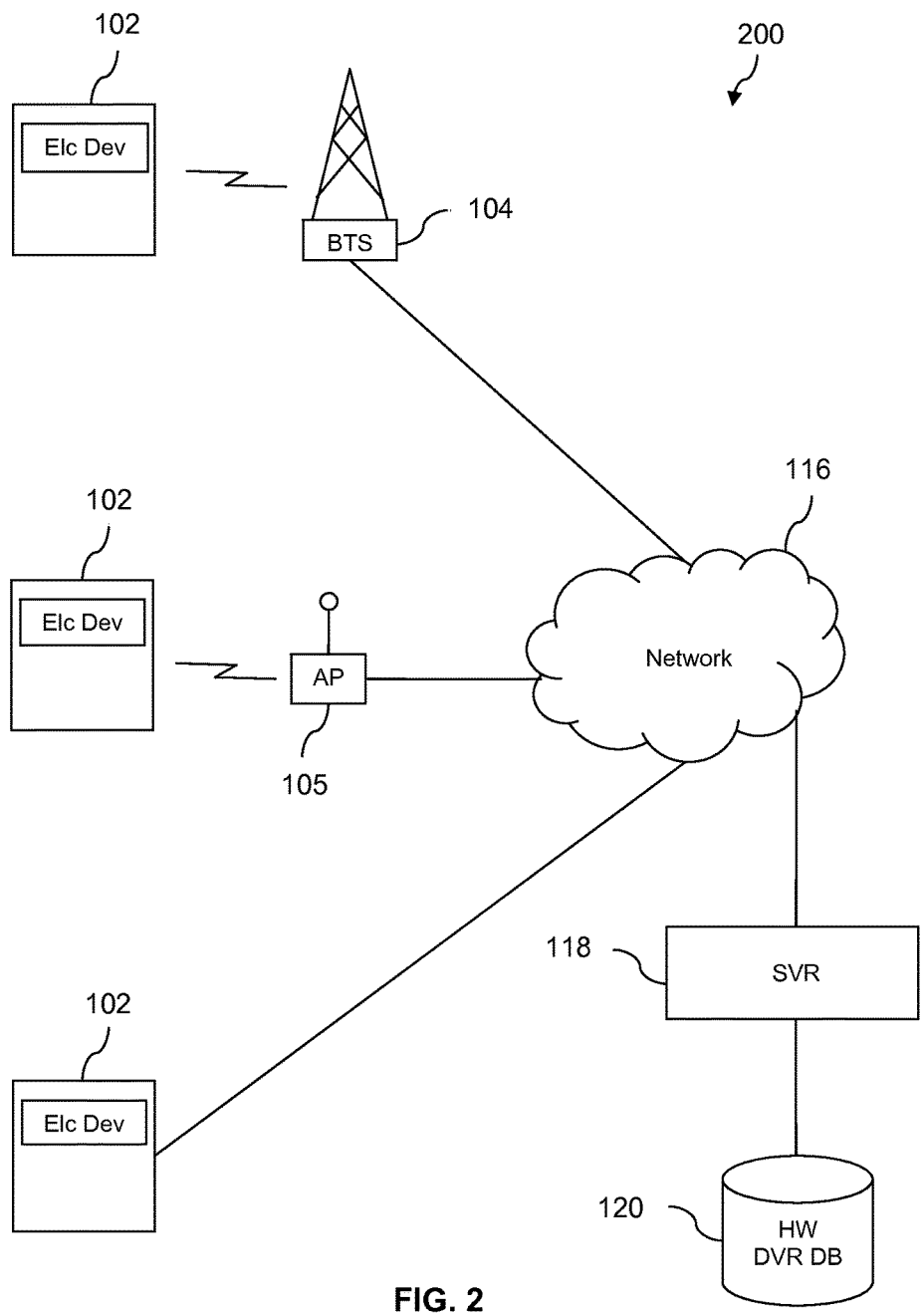
FIG. 2 is an illustration of a communication system according to an embodiment of the disclosure.

Turning now to FIG. 2, a communication system 200 is described. In an embodiment, the communication system 200 comprises the electronic device 102, a base transceiver station (BTS) 104, a wireless access point (AP) 105, a network 116, a trusted server (SVR) 118, and a hardware driver data store (HW DVR DB) 120. The electronic device 102 may access the network 116 through wireless communication with the base transceiver station 104 and/or the wireless access point 105. Additionally, it is contemplated that the electronic device 102 may be hardwired to the network 116. The network 116 may be connected to the trusted server 118 which may be connected to the hardware driver data store 120.

The electronic device 102 may obtain drivers from the hardware driver data store 120. The drivers may be device drivers, hardware driver, or some other form of drivers configured to facilitate communication between the electronic device 102 and peripheral components. The following embodiments will be discussed with reference to hardware drivers, but it should be understood that the embodiments may alternatively implement other drivers as discussed hereinabove. In an embodiment, the electronic device 102 may obtain hardware drivers from the hardware driver data store 120 in a manner that preserves the integrity of the trusted security zone 160. For example, the electronic device 102 may obtain the hardware drivers through end-to-end trusted communications infrastructure as described hereinabove. The hardware drivers may comprise the hardware drivers 132 to be installed in the permissive sector 150 and/or the trusted hardware drivers 130 to be installed in the trusted security zone 160. At the time of installation, the second trusted application 114 may gather information about the uncompromised state of the hardware drivers and store the information in the trusted security zone 160. The information may be information about the error detection action as described hereinabove with reference to FIG. 1. When the hardware drivers are stored in the permissive sector 150, the hardware drivers may be configured for use by both the non-trusted applications 112 and the trusted applications 114. The electronic device 102 may allow the non-trusted applications 112 to invoke the hardware drivers without first verifying the integrity of the hardware drivers; however, in order to preserve the trusted environment, the electronic device 102 will perform the confidence check on the hardware drivers before the trusted applications 114 invoke the hardware drivers.

If the hardware driver to be invoked by one of the trusted applications 114 is determined to be in the uncompromised state, the electronic device 102 may allow the trusted application 114 to invoke the driver and proceed as normal. When the hardware driver to be invoked by the trusted application 114 is determined to be compromised and/or otherwise altered from the uncompromised state, the electronic device 102 may take action to prevent the trusted application 114 from invoking the hardware driver in response to the determination. In an embodiment, the electronic device 102 may arrest the activity of the trusted application 114 and prompt a user with an option to either continue, and risk the integrity of the trusted security zone 160, or abort the activities of the trusted application 114. Alternatively, the electronic device 102 may replace the compromised hardware driver with a new, uncompromised hardware driver taken from the hardware driver data store 120.

In an embodiment, hardware drivers may be obtained from the hardware driver data store 120, and each hardware driver may have a version stored in the permissive sector 150 and a version stored in the trusted security zone 160. A version may be a copy of the hardware driver. The electronic device 102 may be configured to obtain hardware drivers from the hardware driver data store 120, store the hardware drivers in the trusted security zone 160, and copy a version of the hardware drivers stored in the trusted security zone 160 into the permissive sector 150. The trusted applications 114 may be configured to use exclusively trusted versions of the hardware drivers, they may be configured to use exclusively versions of the hardware drivers stored in the permissive sector 150 that have been confirmed to be in the uncompromised state, or they may be configured to use versions of the hardware drivers interchangeably provided that the hardware drivers have been determined to be in the uncompromised state. In an embodiment, when a hardware driver stored in the permissive sector 150 is determined to be compromised and/or otherwise changed from its uncompromised state, the electronic device 102 may copy an uncompromised version of the hardware driver from the trusted security zone 160 to the permissive sector 150 such that the trusted applications 114 may invoke the driver with confidence.

Figure 3:
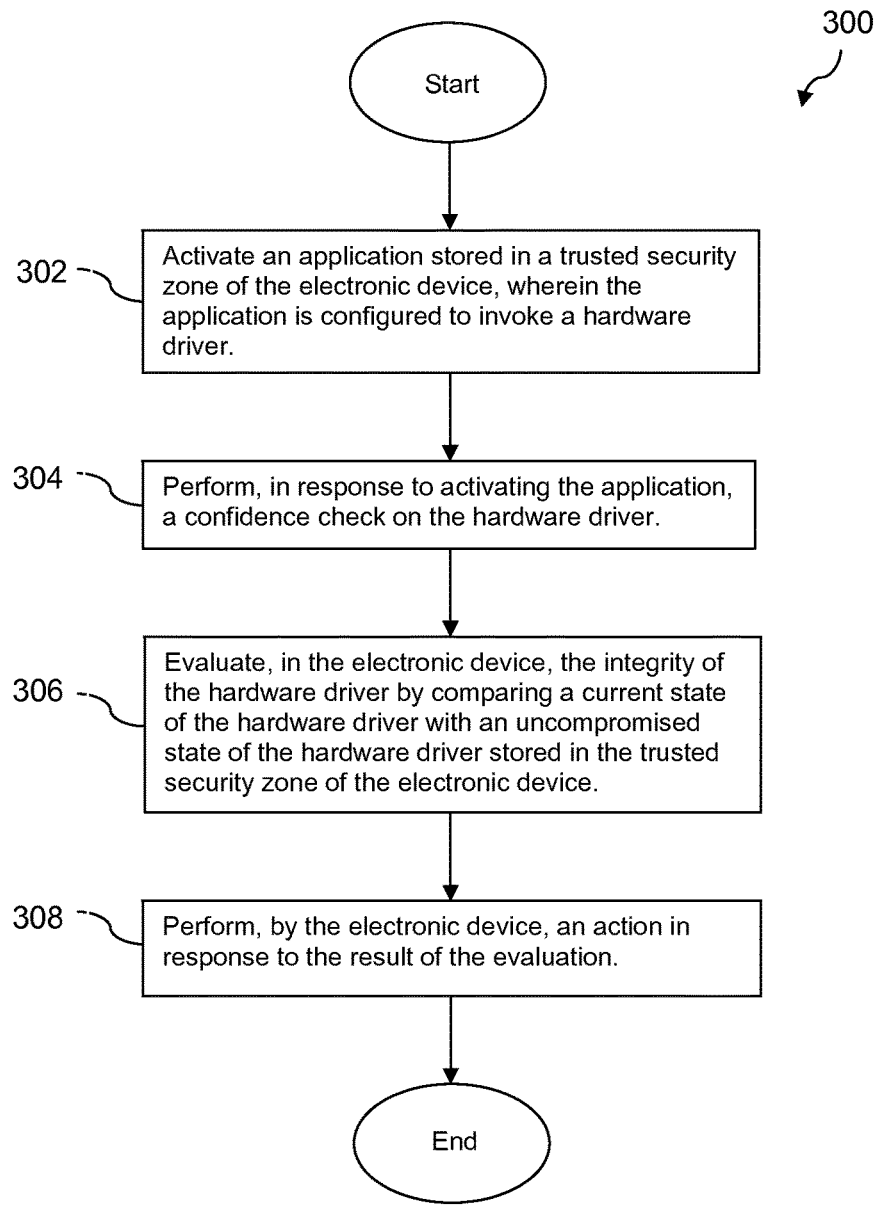
FIG. 3 is a flow chart of a method according to an embodiment of the disclosure.

In FIG. 3, a method 300 is described. The method will be discussed with reference to hardware drivers, but it should be understood that the method may alternatively implement device drivers or other drivers as discussed hereinabove with reference to FIG. 2. At block 302, an application that is stored in a trusted security zone of an electronic device and is configured to invoke a hardware driver may be activated. A confidence check on the hardware driver may be performed at block 304 in response to activating the application. The confidence check may comprise activating a second application stored in the trusted security zone that is configured to perform the confidence check as described hereinabove with reference to FIG. 1 and FIG. 2. The integrity of the hardware driver may be evaluated by comparing a current state of the hardware driver to an uncompromised state of the hardware driver stored in the trusted security zone at block 306. In an embodiment, the comparison may be made by the second application stored in the trusted security zone. At block 308, an action may be performed, by the electronic device, in response to the result of the evaluation. The action may be to allow the application to invoke the hardware driver when the result indicates that the hardware driver is in the uncompromised state. Alternatively, the action may be to prevent the application from invoking the hardware driver when the result indicates that the hardware driver is compromised and/or altered from the uncompromised state. The electronic device may replace the current state of the hardware driver with the uncompromised state of the hardware driver. Replacing the current state of the hardware driver with the uncompromised state of the hardware driver may comprise copying a version of the uncompromised state of the hardware driver from the trusted security zone into the permissive sector. The compromised and/or altered hardware driver may then be removed from the electronic device. In an embodiment, the electronic device may prompt a user with an option to either allow the application to invoke the hardware driver or to prevent the application from invoking the hardware driver when the result indicates that the hardware driver is compromised and/or altered from the uncompromised state.

Performing the confidence check on the hardware driver when the application stored in the trusted security zone is activated may help to prevent the trusted security zone from being invaded by nefarious programs. By retaining a secure trusted security zone, the user may experience greater security while operating the electronic device. For example, with the trusted security zone intact, the user may have confidence that credit card information and/or other confidential personal information is not being accessed or viewed by nefarious programs while the user is interacting with such information in the trusted security zone.

Figure 4:
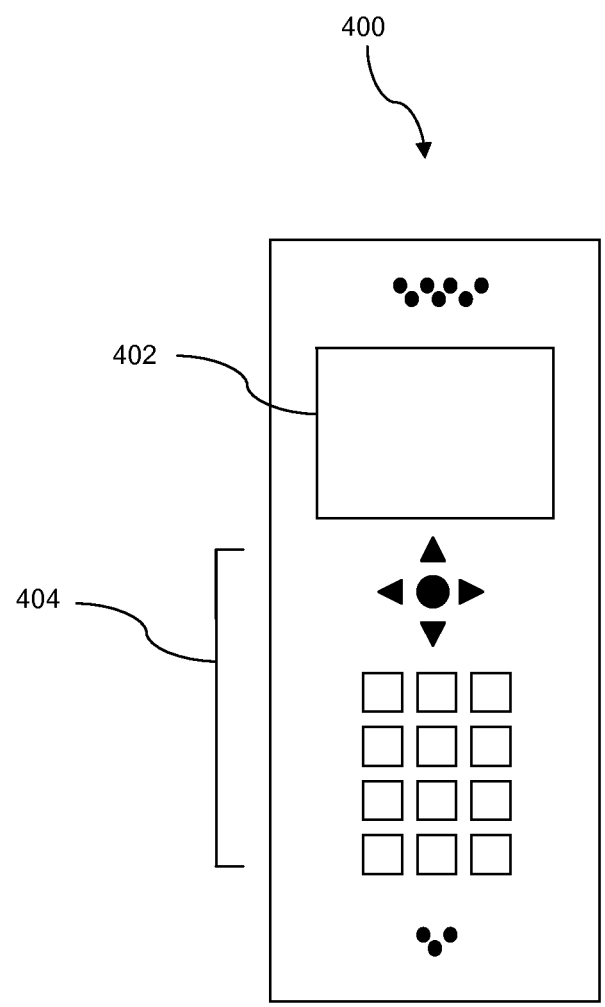
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
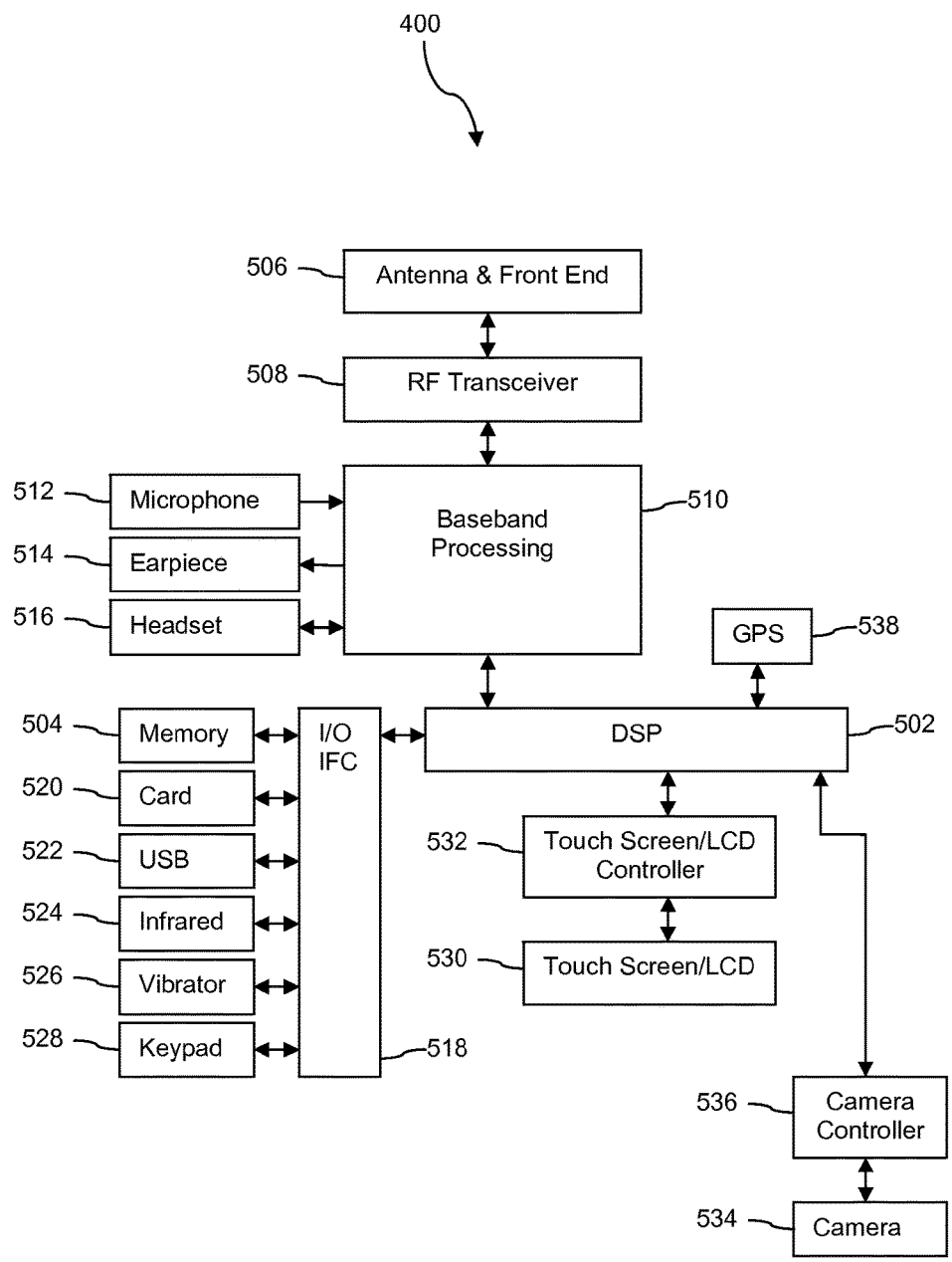
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
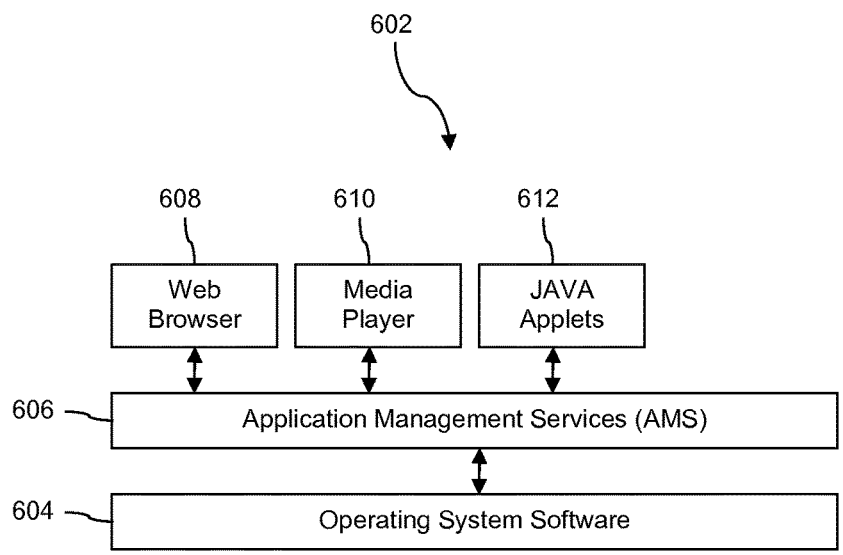
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
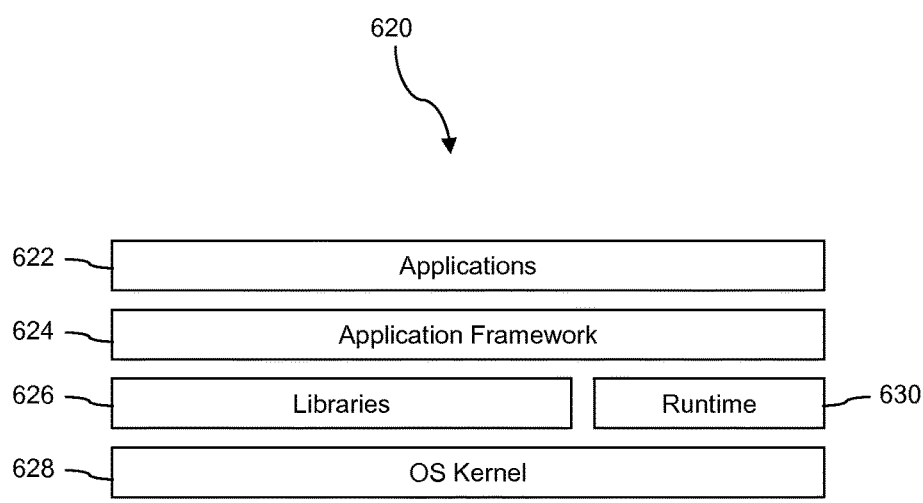
FIG. 6B is a block diagram of another software architecture according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
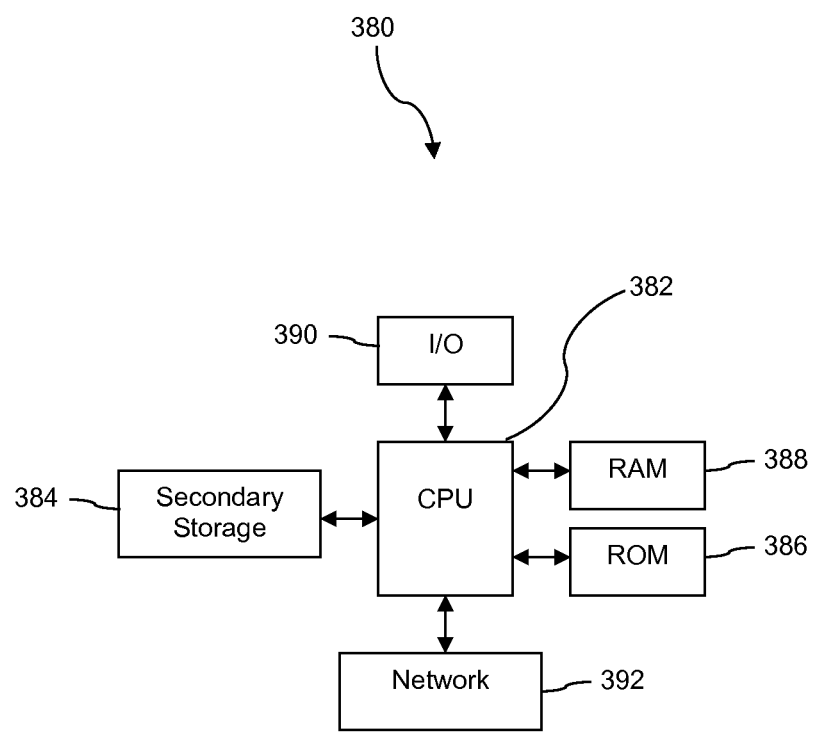
FIG. 7 is a block diagram of computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device, comprising:
 at least one processor that includes:
  a normal partition of the at least one processor that is associated with a permissive sector, and
  a secure partition of the at least one processor that is associated with a trusted security zone, the trusted security zone providing a hardware root of trust and an operating system for the secure partition that runs separate from a normal partition operating system, wherein the trusted security zone ceases execution of non-trusted applications in the permissive sector during execution of at least one trusted application in the secure partition;
 a non-transitory memory that includes:
  a normal partition of the non-transitory memory that is associated with the permissive sector, the permissive sector allowing non-trusted applications to invoke hardware drivers stored in the normal partition, and
  a secure partition of the non-transitory memory that is associated with the trusted security zone and comprises a trusted version of a hardware driver that provides information about an uncompromised state associated with the hardware driver, wherein the trusted security zone is separate from the permissive sector;
 the hardware driver associated with a version that is stored in the non-transitory memory and comprises a current state, wherein the hardware driver is at least initially stored in the normal partition of the non-transitory memory;
 a first trusted application, stored in the secure partition of the non-transitory memory associated with the trusted security zone, configured to invoke the hardware driver in response to activation instructions; and
 a second trusted application, stored in the secure partition of the non-transitory memory associated with the trusted security zone, that when executed by the secure partition of the at least one processor, configures the secure partition of the at least one processor to:
  amass the information about the uncompromised state associated with the hardware driver,
  store, in the secure partition of the non-transitory memory, the information about the uncompromised state associated with the hardware driver,
  perform, in response to receipt of the activation instructions by the first trusted application, a confidence check on the version of the hardware driver stored in the permissive sector and compare, in response to receipt of the activation instructions by the first trusted application, the trusted version of the hardware driver with the version of the hardware driver stored in the permissive sector and the information about the uncompromised state associated with the hardware driver with the current state of the hardware driver, and
  enable, based on the confidence check and in response to a result of the comparison indicating that the version of the hardware driver stored in the permissive sector corresponds with the trusted version of the hardware driver and the current state of the hardware driver corresponds to the uncompromised state associated with the hardware driver, the first trusted application stored and executed in the secure partition of the trusted security zone to invoke the hardware driver, wherein the hardware driver is invoked by the first trusted application responsive to the enablement by the second trusted application.

2. The electronic device of claim 1,
 wherein the information about the uncompromised state of the hardware driver is associated with an error detection action, and
 wherein the information associated with the error detection action comprises at least one of: a checksum, a bit count of the driver, information about a cyclic redundancy check, information about a repetition code, information about a horizontal redundancy check, information about a vertical redundancy check, information about a parity bit, a digital signature, or information about a cryptographic hash function.

3. The electronic device of claim 1, wherein the uncompromised state is associated with the hardware driver being free from sniffers, malware, Trojans, spyware, viruses, or other nefarious programs.

4. The electronic device of claim 1, wherein the second trusted application further configures the secure partition of the at least one processor to: perform a confidence check on the current state of the driver prior to the comparison of the uncompromised state of the driver with the current state of the driver.

5. The electronic device of claim 1, wherein the current state of the hardware driver corresponds with the uncompromised state responsive to the comparison indicating that the current state is unaltered from the uncompromised state.

6. The electronic device of claim 1, wherein responsive to the comparison indicating that the current state of the hardware driver does not correspond with the uncompromised state, the second trusted application:
  replace the hardware driver with another hardware driver that is in the uncompromised state,
  prevent the first trusted application from invoking the hardware driver, or
  prompt a display of the electronic device with options for user input to authorize invocation of the hardware driver by the first trusted application.

7. The electronic device of claim 1, wherein the hardware driver stored in the normal partition of the non-transitory memory is a copy of the trusted version of the hardware driver.

8. The electronic device of claim 1, wherein the version of the hardware driver is accessible to applications stored in the secure partition of the non-transitory memory and to applications stored in the normal partition of the non-transitory memory associated with the permissive sector.

9. The electronic device of claim 1, wherein the first trusted application invokes at least one of the trusted version of the hardware driver or the version of the hardware driver.

10. The electronic device of claim 1, wherein responsive to the results indicating that the version of the hardware driver stored in the permissive sector does not correspond with the trusted version of the hardware driver, the electronic device:
  replaces the hardware driver with the trusted version of the hardware driver,
  prevents the first trusted application from invoking the hardware driver, or
  configures a display of the electronic device that presents options to receive user input corresponding to authorization that invokes the hardware driver by the first trusted application.

11. The electronic device of claim 1, wherein the second trusted application is further configured to determine whether the trusted version of the hardware driver corresponds with the version of the hardware driver stored in the normal partition of the non-transitory memory in response to powering on the electronic device.

12. The electronic device of claim 1, wherein a non-trusted application in the permissive sector invokes the hardware driver stored in the normal partition without the second trusted application verifying the integrity of the hardware driver.

13. A method for invoking a hardware driver on an electronic device, comprising:
  storing, by an electronic device in a secure partition of a non-transitory memory of an electronic device, a trusted version of a hardware driver that provides information about an uncompromised state associated with the hardware driver, wherein the secure partition is associated with a trusted security zone providing a hardware root of trust to the electronic device and an operating system for the secure partition that runs separate from a normal partition operating system;
  activating, by at least one processor of the electronic device, a first trusted application stored in the secure partition of the non-transitory memory of the electronic device associated with a trusted security zone providing a hardware root of trust to the electronic device and an operating system for the secure partition that runs separate from a normal partition operating system, wherein the first trusted application is configured to invoke the hardware driver that is initially stored in a normal partition of the non-transitory memory associated with a permissive sector of the electronic device, and wherein the hardware driver is associated with a version;
  performing, by a second trusted application stored in the secure partition of the non-transitory memory associated with the trusted security zone and executed by a secure partition of the at least one processor of the electronic device in response to activating the first trusted application, a confidence check on the version of the hardware driver stored in the permissive sector and comparing, by the second trusted application, the trusted version of the hardware driver with the version of the hardware driver stored in the permissive sector and the information about the uncompromised state associated with the hardware driver with a current state of the hardware driver, wherein the permissive sector allows non-trusted applications to invoke hardware drivers stored in the normal partition, and wherein the trusted security zone ceases execution of non-trusted applications in the permissive sector during execution of at least one trusted application in the secure partition;
  evaluating, by the second trusted application electronic device, the integrity of the hardware driver based on the confidence check and the comparing; and
  enabling, by the second trusted application in response to the evaluation indicating that the version of the hardware driver stored in the permissive sector corresponds with the trusted version of the hardware driver and the current state of the hardware driver corresponds to the uncompromised state associated with the trusted hardware driver, the first trusted application stored and executed in the secure partition of the trusted security zone to invoke the hardware drive, wherein the hardware driver is invoked by the first trusted application responsive to the enablement.

14. The method of claim 13, wherein performing the confidence check comprises performing an error detection action comprising at least one of:
  comparing a checksum value of the uncompromised state of the hardware driver with a checksum value of the current state of the hardware driver,
  comparing a bit count of the uncompromised state of the hardware driver with a bit count of the current state of the hardware driver,
  performing a cyclic redundancy check, performing a repetition code check,
  performing a horizontal redundancy check,
  performing a vertical redundancy check, checking information about a parity bit,
  checking a digital signature, or comparing a digest of a cryptographic hash function applied to the uncompromised state associated with the hardware driver with a digest of the current state of the hardware driver.

15. The method of claim 13, wherein evaluating the integrity of the hardware driver comprises comparing a result of the confidence check to the uncompromised state of the hardware driver stored in the secure partition of the non-transitory memory associated with the trusted security zone of the electronic device.

16. The method of claim 13, wherein the uncompromised state is associated with being free from sniffers, malware, spyware, Trojans, viruses, and other nefarious programs.

17. The method of claim 13, further comprising:
in response to the result that indicates that the current state of the hardware driver does not correspond to the uncompromised state of the trusted hardware driver,
replacing the hardware driver with the trusted version of hardware driver,
preventing the first trusted application from invoking the hardware driver, or
prompting, by configuration of a display, the user with options.

\* \* \* \* \*